United States Patent
Wu

(10) Patent No.: US 10,915,414 B2
(45) Date of Patent: Feb. 9, 2021

(54) TEST CONTROLLER FOR CONCURRENT TESTING OF AN APPLICATION ON MULTIPLE DEVICES WITHOUT USING PRE-RECORDED SCRIPTS

(71) Applicant: CITRIX SYSTEMS, INC., Fort Lauderdale, FL (US)

(72) Inventor: Hao Wu, Nanjing (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 196 days.

(21) Appl. No.: 16/159,020

(22) Filed: Oct. 12, 2018

(65) Prior Publication Data

US 2020/0117564 A1    Apr. 16, 2020

(51) Int. Cl.
| | | |
|---|---|---|
| G06F 11/36 | (2006.01) | |
| G06F 11/263 | (2006.01) | |
| G06F 11/277 | (2006.01) | |
| G06F 11/273 | (2006.01) | |
| G06F 11/267 | (2006.01) | |
| G06K 9/32 | (2006.01) | |

(Continued)

(52) U.S. Cl.
CPC ............ G06F 11/2635 (2013.01); G06F 8/61 (2013.01); G06F 9/445 (2013.01); G06F 11/267 (2013.01); G06F 11/277 (2013.01); G06F 11/2733 (2013.01); G06F 11/3672 (2013.01); G06K 9/325 (2013.01); *G06F 3/04812* (2013.01)

(58) Field of Classification Search
CPC ................ G06F 11/2733; G06F 11/277; G06F 11/3668; G06F 11/3672; G06F 11/3688; G06F 11/3664; G06F 8/38; G06K 9/325; H04W 24/00; H04W 24/04
See application file for complete search history.

(56) References Cited

U.S. PATENT DOCUMENTS 9,176,744 B2    11/2015    Lee
9,538,345 B2    1/2017     Sah et al.
(Continued)

OTHER PUBLICATIONS

"Adaptive Service Provision and Execution in Mobile Environments" by Feda A. AlShahwan ProQuest Dissertations Publishing, 2012 https://dialog.proquest.com/professional/docview/2281847716?accountid=131444 (Year: 2012).*

*Primary Examiner* — Joseph O Schell
(74) *Attorney, Agent, or Firm* — Allen, Dyer, Doppelt + Gilchrist, PA

(57) ABSTRACT

A test controller interfacing between a master computing device and slave computing devices includes a processor configured to launch a master application on the master computing device and a slave application to be tested on each respective slave computing device, with each slave application being the same as the master application. The processor is also configured to receive from the master computing device an input test command along with a test result based on execution of the input test command by the master application, and transmit the received input test command to each slave computing device. In addition, the processor is configured to receive a respective test result from each slave computing device based on execution of the received input test command, and compare each respective test result from the slave computing devices to the test result from the master computing device.

20 Claims, 6 Drawing Sheets

(51) Int. Cl.
*G06F 8/61* (2018.01)
*G06F 9/445* (2018.01)
*G06F 3/0481* (2013.01)

(56) References Cited

U.S. PATENT DOCUMENTS

| | | | | |
|---|---|---|---|---|
| 2009/0036190 A1* | 2/2009 | Brosnan | ............ | G07F 17/3234 |
| | | | | 463/16 |
| 2013/0275376 A1* | 10/2013 | Hudlow | ............ | G07F 17/3241 |
| | | | | 707/639 |
| 2013/0275960 A1* | 10/2013 | Kirchev | ............ | G06F 9/45558 |
| | | | | 717/175 |
| 2015/0019706 A1* | 1/2015 | Raghunathan | ...... | G06F 11/3414 |
| | | | | 709/224 |
| 2015/0242236 A1* | 8/2015 | Nakazono | ........... | G06F 11/3055 |
| | | | | 718/1 |
| 2017/0372171 A1* | 12/2017 | Elgebeely | ................ | G06K 9/72 |
| 2019/0034325 A1* | 1/2019 | Yokoyama | ........... | G06F 11/3688 |

* cited by examiner

TEST CONTROLLER FOR CONCURRENT TESTING OF AN APPLICATION ON MULTIPLE DEVICES WITHOUT USING PRE-RECORDED SCRIPTS

TECHNICAL FIELD

The present disclosure relates to application validation, and more particularly, to a test controller for concurrent testing of an application on multiple devices without using pre-recorded scripts.

BACKGROUND

There are a number of scenarios where a user may want to test an application on multiple devices for consistency. For example, a new application is required to be validated in a variety of device types and system languages to ensure it is compatible before being released. In particular, a device manufacturer may sample test lots of devices for quality assurance. Similarly, a software company may perform tests in different languages to ensure language compatibility. When testing is done manually, this is a very inefficient process.

An improvement to the manual testing of devices has been achieved through automation. This requires writing and pre-recording a series of instructions (i.e., a test script) and replaying the test script on multiple devices. However, at least one shortcoming of automation is that the writing and pre-recording of the test script may take a relatively long time to complete. Also, often times the test script is not reusable when functions and user interfaces of the application are updated. Accordingly, reworking and pre-recording the test script is unavoidable and inefficient.

SUMMARY

A test controller interfacing between a master computing device and a plurality of slave computing devices is disclosed.

The test controller advantageously improves the efficiency of testing an application on multiple computing devices by directly transmitting an input test command from the master computing device to the plurality of slave computing devices simultaneously via the test controller. Accordingly, the testing is implemented without pre-recording or reworking of pre-recorded test scripts that were previously required in order to conduct the testing of an application. In particular, pre-recording takes a significant amount of time and effort to complete and often times is not reusable when the application may have functions and user interfaces that are updated frequently. Thus, the test controller improves testing efficiency through elimination of a significant amount of time and effort that is required to pre-record or rework pre-recorded test scripts.

The test controller includes a processor configured to initiate installation of a master agent on the master computing device, initiate installation of a slave agent on each one of the slave computing devices, and transmit a master launch command to the master agent for the master agent to launch a master application on the master computing device. In addition, the processor is configured to transmit a slave launch command to each of the slave agents for each respective slave agent to launch a slave application to be tested on each respective slave computing device, with each slave application being the same as the master application.

The processor is also configured to receive from the master agent an input test command for the master application along with a test result based on execution of the input test command by the master application, and transmit the received input test command to each slave agent.

In addition, the processor is configured to receive a respective test result from each slave agent based on execution of the received input test command by each respective slave application, and compare each respective test result from the plurality of slave computing devices to the test result from the master computing device.

The input test command may include at least one of a screen touch, a mouse click, and a keystroke on the master computing device captured by the master agent. Also, an operating system of the master computing device may be different than an operating system of at least one of the plurality of slave computing devices. In addition, a respective slave agent may be configured to translate a language of the input test command to a language that is compatible with a respective slave computing device.

The processor may be configured to query the master agent and each one of the slave agents for a respective screen size when the input test command is screen input, and to calculate a screen coordinate of the input test command to match a correlating screen coordinate of that respective slave computing device when the respective screen sizes are different.

The slave agent of each one of the plurality of slave devices may also be configured to detect whether the modified screen coordinate of the input test command can be found at the correlating screen coordinate on a screen of the respective slave computing device to perform the received input test command thereon.

The slave agent of each one of the slave computing devices may be configured to determine whether a text string or an image is present in the test result received from the master agent, and the slave agent on each one of the slave computing devices may also be configured to locate the text string or the image in the test result for each respective slave application to determine whether to indicate the test result as having passed when found, or having failed when not found, for the respective slave computing device.

Another aspect is directed to a method for operating a test controller interfacing between a master computing device and a plurality of slave computing devices. The method includes operating a processor to initiate installation of a master agent on the master computing device, and initiate installation of a slave agent on each one of the slave computing devices. The method also includes transmitting a master launch command to the master agent for the master agent to launch a master application on the master computing device, and transmitting a slave launch command to each of the slave agents for each respective slave agent to launch a slave application to be tested on each respective slave computing device. Each slave application is the same as the master application. In addition, the method includes receiving from the master agent an input test command for the master application along with a test result based on execution of the input test command by the master application, transmitting the received input test command to each slave agent, receiving a respective test result from each slave agent based on execution of the received input test command by each respective slave application, and comparing each respective test result from the plurality of slave computing devices to the test result from the master computing device.

Yet another aspect is directed to a non-transitory computer readable medium for operating a test controller interfacing between a master computing device and a plurality of slave computing devices, and with the non-transitory computer readable medium having a plurality of computer executable instructions for causing the test controller to perform steps as described above.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
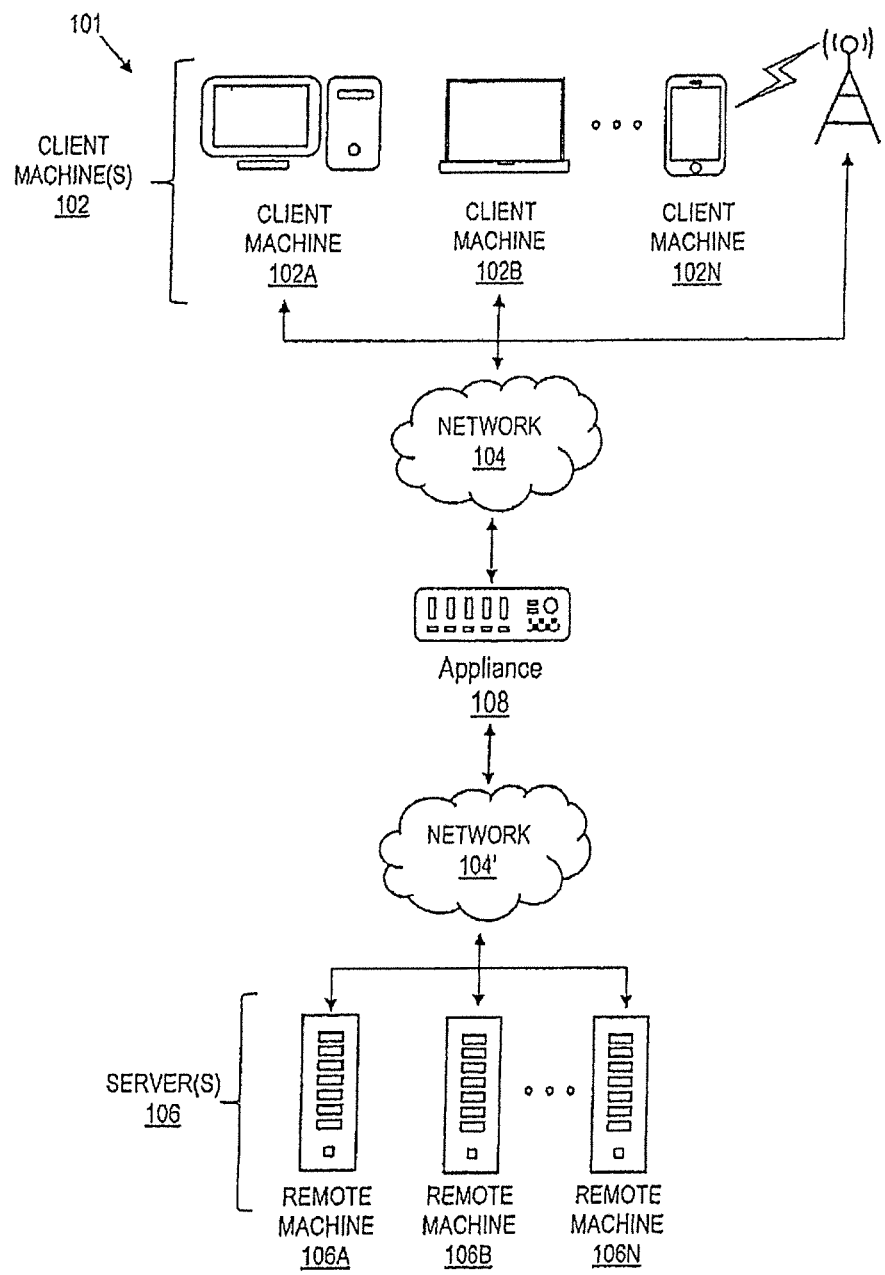
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
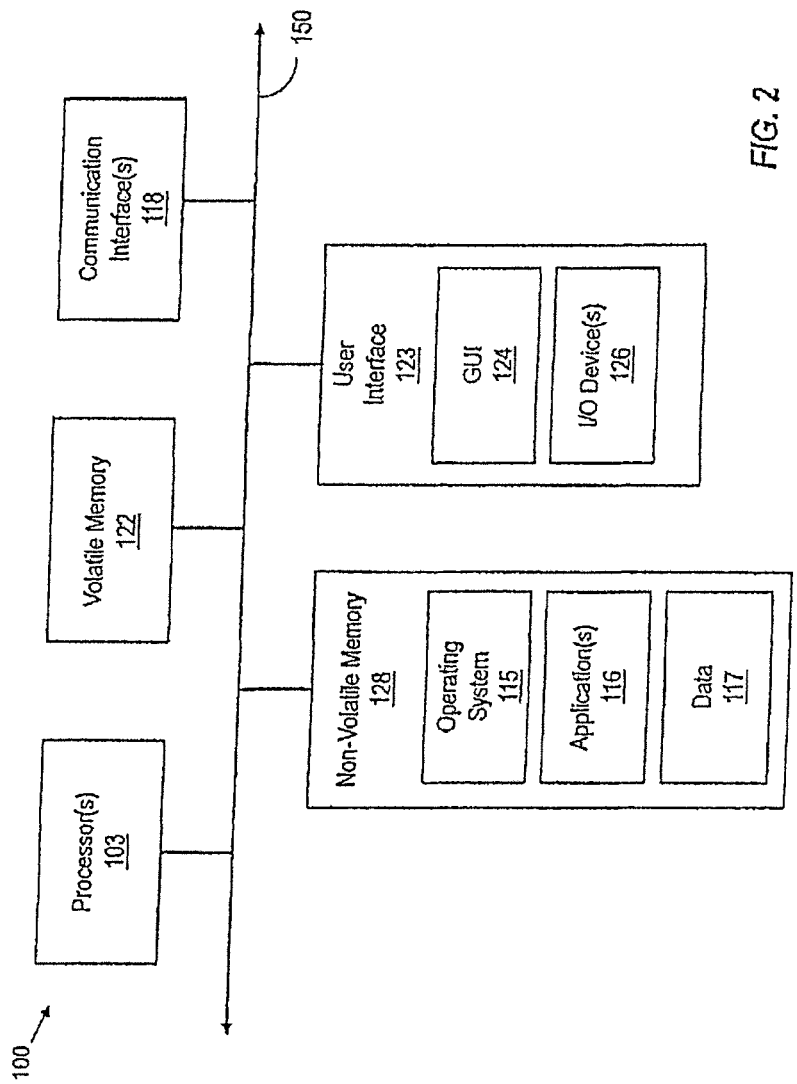
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
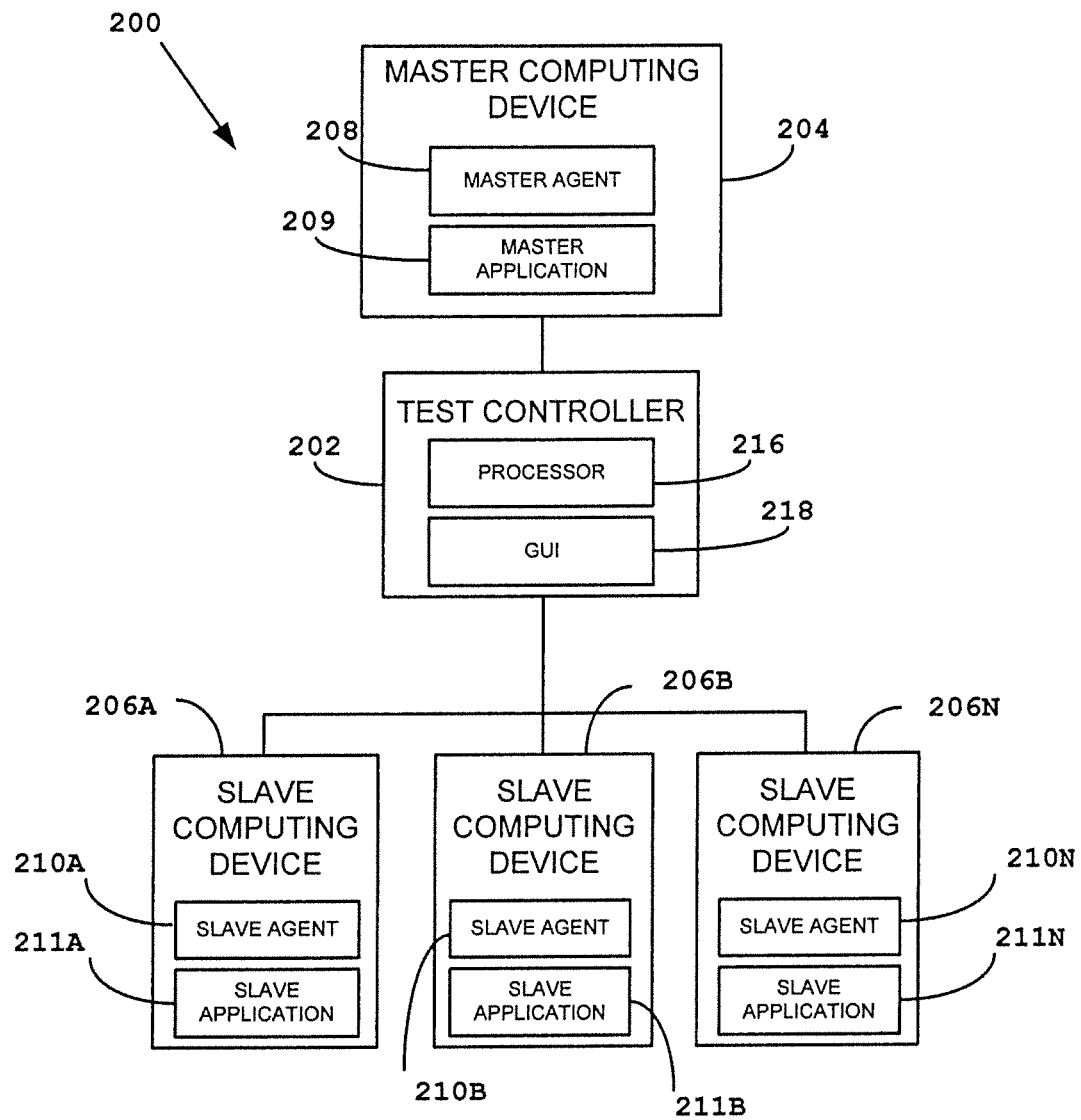
FIG. 3 is a block diagram of a test controller interfacing between a master computing device and a plurality of slave computing devices in which various aspects of the disclosure may be implemented.

Referring initially to FIG. 3, a block diagram 200 of a test controller 202 interfacing between a master computing device 204 and a plurality of slave computing devices 206A-206N in which various aspects of the disclosure may be implemented is illustrated. The plurality of slave computing devices may be generally referred to as slave device 206. The master computing device 204 includes a master agent 208 and a master application 209 installed thereon. Similarly, the plurality of slave devices 206A-206N each include a respective slave agent 210A-210N that is configured to receive a test input command from the test controller 202 and transmit the test results to the controller 202. The slave agents may be generally referred to as slave agent 210. In addition, the plurality of slave devices 206 each include a respective slave application 211A-211N that is to be tested. The slave applications may be generally referred to as slave application 211.

The test controller 202 advantageously improves the efficiency of testing an application on the plurality of slave computing devices 206 by directly transmitting an input test command from the master computing device 204 to the plurality of slave computing devices 206 simultaneously via the test controller 202. The testing is implemented without pre-recording or reworking of pre-recorded scripts that were previously required in order to conduct the testing of an application. Thus, the test controller 202 improves testing efficiency through the elimination of a significant amount of time and effort that is required to pre-record or rework pre-recorded scripts in order to test an application on different computing devices.

As explained in more detail below, during testing, one computing device acts as the master computing device 204 sending actions via the test controller 202 to one or more other computing devices acting as slave computing devices 206. In addition to performing device and language compatibility testing, the present disclosure can also be implemented when conducting device sampling testing. For example, any one computing device of the sample set can be configured as the master computing device 204 and a representative number of any of the other devices of the sample set can be configured as the slave computing devices 206 in order to complete the testing in a shorter period of time than previously was possible.

The test controller 202 comprises a computing device configured to contemporaneously transmit the input test command from the master computing device 204 to the slave computing devices 206. The slave computing devices 206 concurrently receive an input test command from the test controller 202, where the slave computing devices 206 are coupled to the test controller 202 via a wired or wireless connection, or network. Thus, an application can be tested in real-time on a plurality of devices simultaneously including language testing with no record and play mechanism required.

In particular, the master computing device 204 comprises the master agent 208 that is configured to capture the input test commands from a user of the master application 209. The master agent 208 is configured to transmit the input test commands to the test controller 202. Each of the slave computing devices 206 include a computing device configured to receive the input test commands from the test controller 202 via a respective slave agent 210. Each of the slave computing devices 206 are hardwired or wirelessly coupled to the test controller 202.

The processor 216 of the test controller 202 is configured to initiate installation of the master agent 208 on the master computing device 204 and initiate installation of the slave agent 210 on each one of the slave computing devices 206. In addition, the processor 216 is configured to transmit a master launch command to the master agent 208 for the master agent 208 to launch a master application 209 on the master computing device 204, and similarly transmit a slave launch command to each of the slave agents 210 for each respective slave 206 to launch the slave application 211 to be tested on each respective slave computing device 206, with each slave application 211 being the same as the master application 209. The processor 216 is also configured to receive from the master agent 208 an input test command for the master application 209 along with a test result based on execution of the input test command by the master application 209, and to transmit the received input test command to each slave agent 210. In addition, the processor 216 is configured to receive a respective test result from each slave agent 210 based on execution of the received input test command by each respective slave application 211, and compare each respective test result from the plurality of slave computing devices 206 to the test result from the master computing device 204.

As described below in more detail with reference to FIG. 5, the processor 216 is configured to perform the necessary calculations to accommodate different screen sizes between the master computing device 204 and a respective slave computing device 206 when transmitting the input test command to the respective slave computing device 206. The processor 216 is configured to display the test result (e.g., pass or fail) for each of the slave computing devices 206 on a graphical user interface 218 each time an input test command is transmitted to the plurality of slave computing devices 206.

Figure 4:
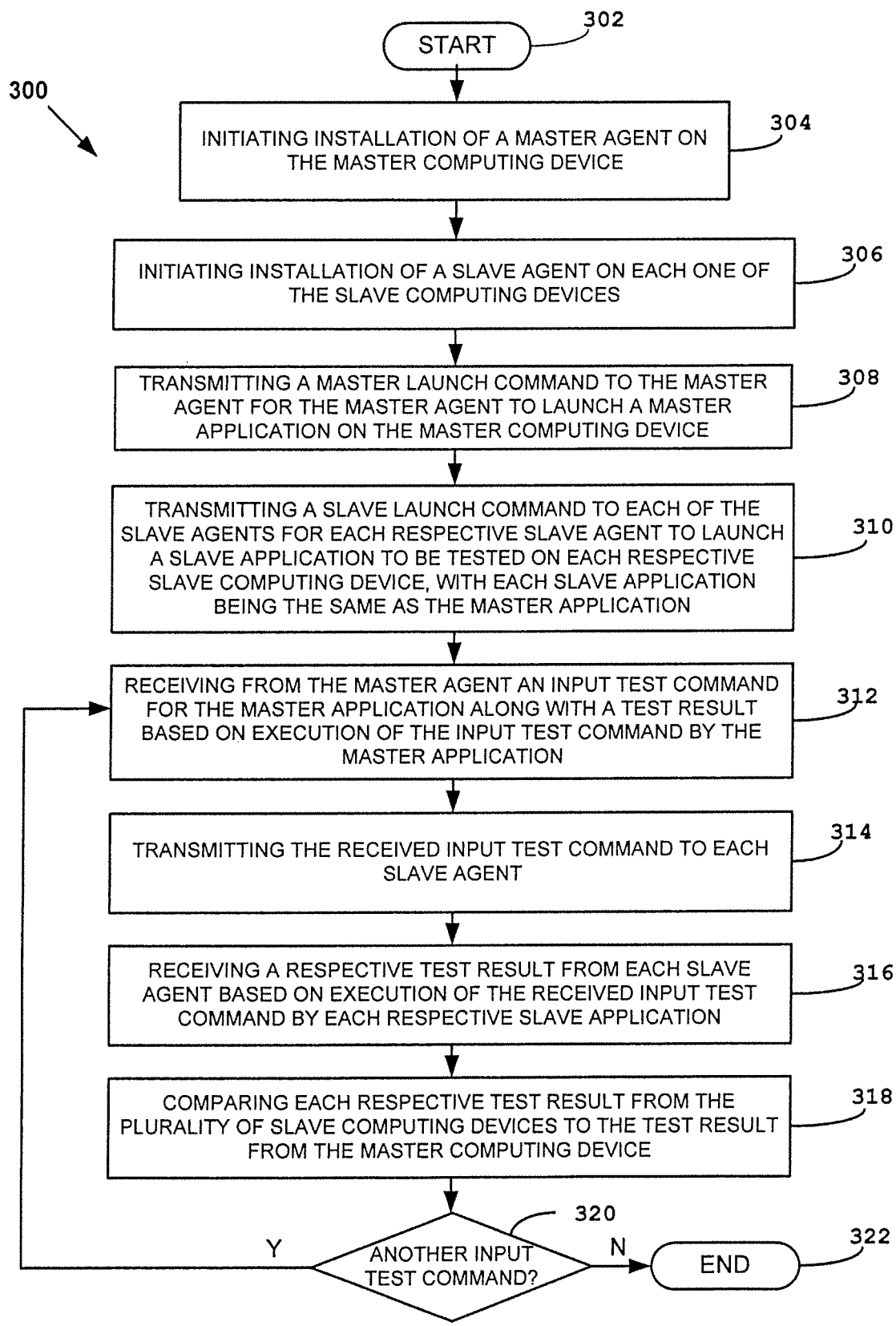
FIG. 4 is a general flowchart illustrating a method for operating the test controller illustrated in FIG. 3.

FIG. 4 depicts a general flowchart 300 illustrating a method for operating the test controller illustrated in FIG. 3. The testing process begins, at block 302, and the installation of a master agent 208 on the master computing device 204 is initiated, at block 304. Also, the installation of a slave agent 210 on each one of the slave computing devices 206 is initiated, at block 306. The installation of the master and slave applications 209, 211 can be triggered by the test controller 202 being configured to push an application installation package or installation universal resource locator (URL) to the master and slave computing devices 204, 206, so that the master and slave agents 208, 210 will install the master and slave application 209, 211 on the master computing device 204 and the respective slave computing device 206.

Moving to block 308, a master launch command is transmitted to the master agent 208 for the master agent 208 to launch the master application 209 on the master computing device 204. A slave launch command is transmitted, at block 310, to each of the slave agents 210 for each respective slave agent 210 to launch the slave application 211 to be tested on each respective slave computing device 206, with each slave application 211 being the same as the master application 209.

At block 312, an input test command for the master application 209 is received from the master agent 208 along with a test result based on execution of the input test command by the master application 209.

The input test command may be manual input or automated script. The input test command on the master computing device 204 is captured by the master agent 208. The input test command includes a keystroke, screen touch or swipe, for example, by a user on the master device 204 using the master application 209. If the test input command is a screen touch or mouse click, coordinates correlating to a position on a screen of the master device 204 will be captured. The master agent 208 is configured under a "push" mode to transmit the test input command captured on the master device 204 to be received by the controller 102, at 206.

If the input test command is keyboard input, the keystroke will be transmitted to the test controller 202 and if the input test command is a screen touch or mouse click, for example, the screen coordinate will be sent to test controller 202.

The master agent 208 and each one of the slave agents 210 is queried for a respective screen size when the input test command is screen input, and to calculate the screen coordinate of the input test command to match a correlating screen coordinate of that respective slave computing device 206 when the respective screen sizes are different. The correlation is advantageous in order to transmit the screen coordinates of the screen touch or mouse click from the master agent 208 to match the proper location on the screen of the slave device 206.

In addition, the method may include to transmit screen information to the respective slave agent 210 where the screen information may include the size of the screen of the master computing device 204, a "clicked" coordinate on the screen of the master computing device 204, and a "clicked" area image from the screen of the master computing device 204. The "clicked" area may be a rectangle shape (e.g., 5 pixels×5 pixels), which is captured from the screenshot of the master computing device 204 before the execution of input test command, and using the "clicked" coordinate as the center point.

For a keystroke input test command, the respective slave agents 210 are configured to execute the same keystroke command on the respective slave computing device 206. For a screen input test command (e.g., screen touch, swipe, click, etc.), if the slave agent 210 receives only the coordinates for the screen input test command, the slave agent 210 is configured to perform the same screen input on the slave device 206 without modifying the coordinates. However, if the respective slave agent 210 receives the coordinates, the screen size of the master device 204, and a "clicked" area from the master computing device 204, then the respective slave agent 210 is configured to convert the coordinates to correlate the screen size of the respective slave computing device 206 as described in more detail below with reference to FIG. 5.

The received input test command is transmitted, at block 314, to each slave agent 210, and a respective test result is received, at block 316, from each slave agent 210 based on execution of the received input test command by each respective slave application 211.

In addition to transmitting the input test command to the test controller 202, the master agent 210 is configured to transmit the test result to the controller 202, where the test result includes text or image changes on the screen of the master computing device 204. For example, a comparison of a screenshot taken before execution of the input test command (e.g., keystroke) on the master application 209 with a screenshot after the execution of the input test command will help determine if the testing was passed by a particular slave computing device 206 as described in more detail below with reference to FIG. 6.

Each respective test result from the plurality of slave computing devices 206 is compared, at 318, to the test result from the master computing device 204. Moving to block 320, the method determines whether another input test command is to be tested, and if yes, then the method returns to block 312 in order to receive another input test command along with a respective test result based on execution of the input test command by the master application 209. If no further input test commands are to be received, the method ends at block 322.

Figure 5:
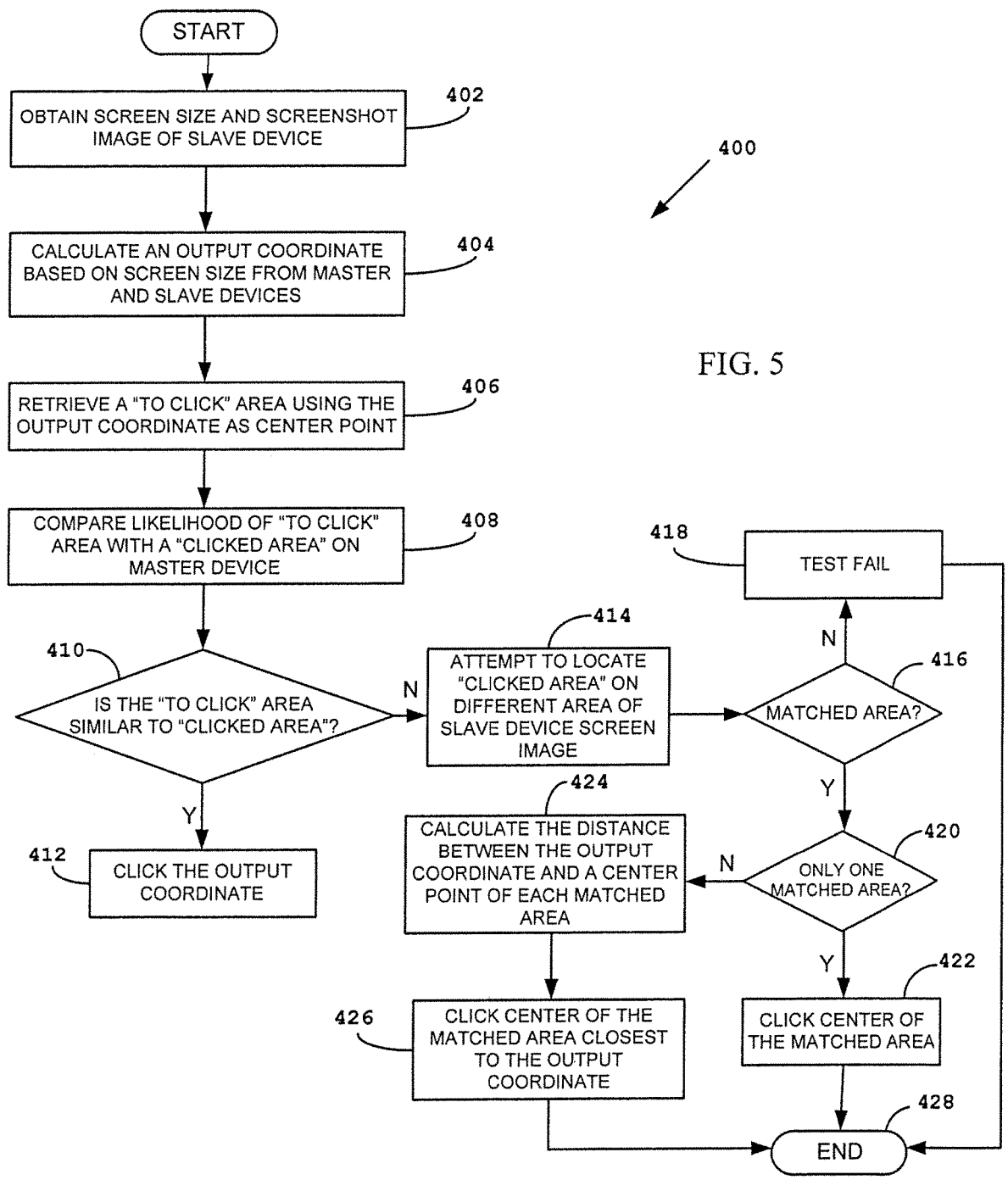
FIG. 5 is a general flowchart illustrating a method for testing screen input on the slave computing devices illustrated in FIG. 3.

FIG. 5 is a general flowchart illustrating a method for testing a screen input test command on the slave computing devices 206 of FIG. 3 in accordance with the present disclosure. In particular, the method is directed to converting differences between the screen sizes of the master computing device 204 and the slave computing devices 206. The method begins, at block 401, and a screen size and a screenshot image, at block 402, of the slave computing device 206 is obtained. Output coordinates are calculated, at block 404, based on the screen size from the master computing device 204 and the respective slave computing devices 206 using the following equation:

Output coordinates[$X_{output}$, $Y_{output}$]=Input coordinates [$X_{input}$*width of slave device/width of master device, $X_{input}$*height of slave device/height of master device]

A "to click" area (e.g., 5 pixels×5 pixels) is retrieved, at block 406, using the calculated output coordinates as a center point from the screenshot image of the respective slave computing device 206. Moving to block 408, a comparison of the "to click" area with the "clicked area" on the master computing device 204 is made and a likelihood that they are similar is determined. As those of ordinary skill in the art can appreciate, there are available algorithms that compare images for similarities and differences.

In the event that the "to click" area and the "clicked area" are determined to be similar, at block 410, the slave computing agent 210 is configured to "click" the calculated output coordinates on the slave computing device 206, at block 412. However, if the "to click" area and the "clicked area" are determined to be different (i.e., likelihood below a threshold), at block 410, the slave computing agent 210 is configured to locate a match of the "clicked area" on a different area of the slave computing device screen image, at block 414. If there are no matched areas located, at block 416, then the test of the slave application 209 is indicated as failed, at block 418. Otherwise, if a matched area is located, at block 416, but only one matched area is located, at block 420, the slave agent 210 is configured to use a center of this matched area as the coordinates to click on the screen of the slave computing device 206.

If there is more than one matched area located, at block 420, then the distance (Euclidean metric) between the output coordinates and a center point of each matched area is calculated, at block 424. The center of the matched area closest to the output coordinate is clicked on the slave computing device 206 for the testing of the slave application 209. The method ends at block 428.

Figure 6:
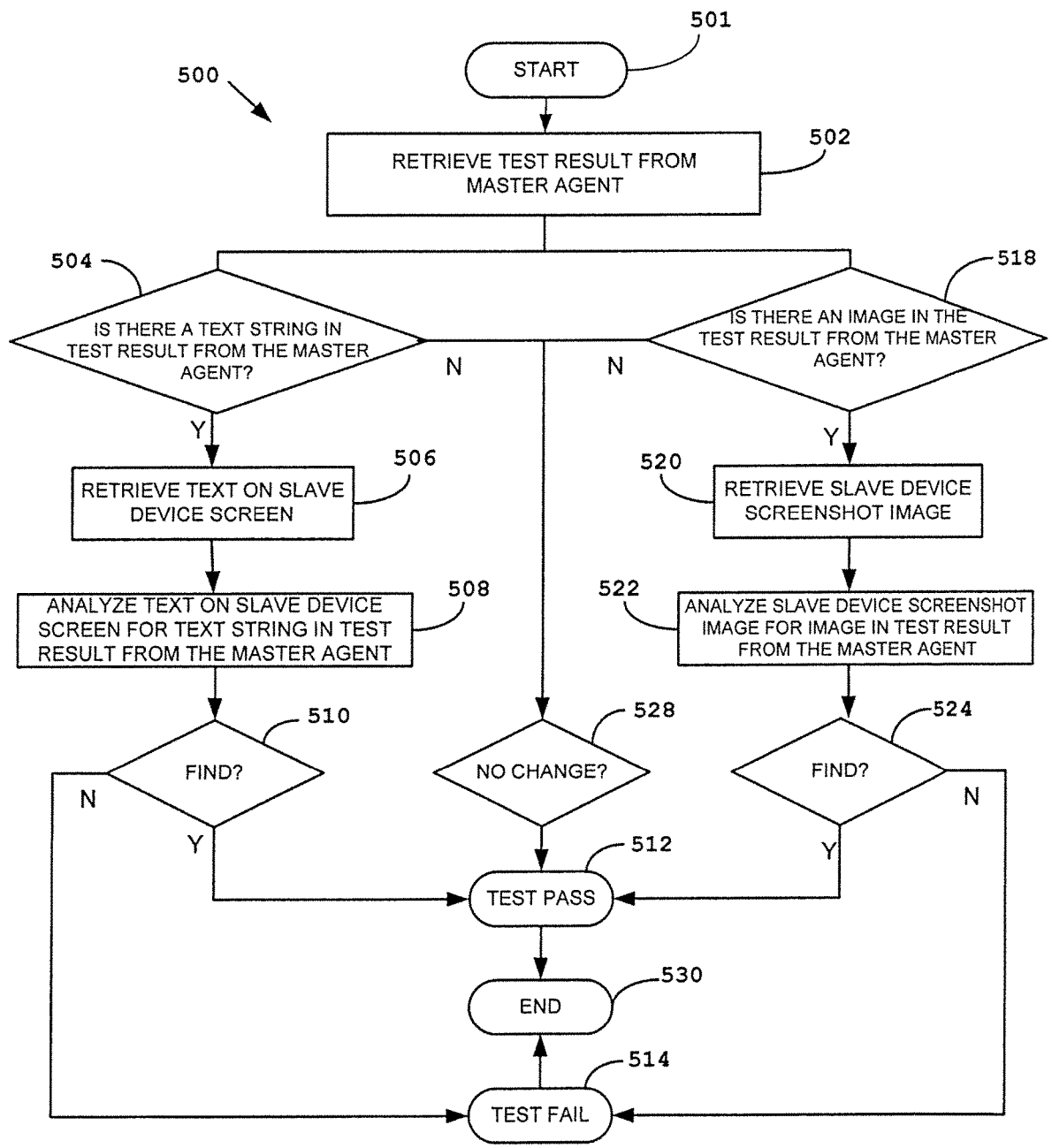
FIG. 6 is a general flowchart illustrating a method for determining whether a test was passed on the slave computing devices illustrated in FIG. 3.

Referring now to FIG. 6, is a general flowchart illustrating a method for determining whether a test was passed on the slave computing devices 206 illustrated in FIG. 3. The test result is retrieved, at block 502, by the respective slave agents 210. Moving to block 504, the slave agent 210 determines whether there is a text string in the test result from the master agent 208. If there is a text string in the test result, then, at 506, the slave agent 210 retrieves text present on the screen of the slave computing device 206. The text on the slave computing device 206 is analyzed, at 508, to attempt to locate a match to the text string. For example, if the text string reflects a new added or modified text string, then a match of the text string should be found in the text on the screen of the slave computing device 206. If the test result from the master agent 208 reflects a removed text string, then the text string should not be found on the screen of the slave computing device 206. In addition, if the master computing device 204 and a particular slave computing device 206 are not in the same system language (i.e., master computing device 204 is English while slave computing device 206 is in German), the slave agent 210 is configured to translate the text string before beginning to analyze for a match. In addition, the master device 204 and the slave computing devices 206 may be using different operating systems. For example slave computing device 206A may be an Android operating system and slave computing device 206B may have an iOS operating system.

If a successful match of the text string is located in the text on the screen of the slave computing device 206, at block 510, then the slave agent 210 reports, at block 512, to the test controller 202 as having passed the test and the testing of the slave application 209 ends, at block 530. If no successful match is made, then the slave agent 210 reports, at block 514, to the test controller 202 as having failed the test and the testing ends, at block 530.

Still referring to FIG. 6, the slave agent 210 determines, at block 518, whether there is an image in the test result from the master agent 208. If there is an image in the test result, then, at block 520, the slave agent 210 retrieves the respective slave device screenshot image. The screenshot image on the slave device 206 is analyzed, at block 522, to attempt to locate a match to the image of the test result from the master agent 208. If a successful match of the image is located in the screenshot image of the slave computing device 206, at block 524, then the slave agent 210 reports, at block 512, to the test controller 202 as having passed the test and the testing of the slave application 209, at block 514. If no successful match is made, then the slave agent 210 reports, at block 514, to the test controller 202 as having failed the test and the testing of the slave application 209, at block 514. If there is no change in text or image described in the test result from the master agent 208, then, at block 528, the slave agent 210 reports, at block 512, to the test controller 202 as having passed the test and the testing ends, at block 514.

Another aspect is directed to a non-transitory computer readable medium for operating a test controller 202 interfacing between a master computing device and a plurality of slave computing devices. The non-transitory computer readable medium has a plurality of computer executable instructions for causing the test controller 202 to perform steps comprising operating a processor 216 to initiate installation of a master agent 208 on the master computing device 204, initiate installation of a slave agent 210 on each one of the slave computing devices 206, transmit a master launch command to the master agent 208 for the master agent 208 to launch a master application 209 on the master computing device 204, and transmit a slave launch command to each of the slave agents 210 for each respective slave agent 210 to launch a slave application 211 to be tested on each respective slave computing device 206, with each slave application 211 being the same as the master application 209. In addition, the processor 216 is configured to receive from the master agent 208 an input test command for the master application 209 along with a test result based on execution of the input test command by the master application 209, transmit the received input test command to each slave agent 210, and receive a respective test result from each slave agent 210 based on execution of the received input test command by each respective slave application 211. The processor 216 is also configured to compare each respective test result from the plurality of slave computing devices 206 to the test result from the master computing device 204.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A test controller interfacing between a master computing device and a plurality of slave computing devices and comprising:
   a processor configured to perform the following:
   initiate installation of a master agent on the master computing device,
   initiate installation of a slave agent on each one of the slave computing devices,
   transmit a master launch command to the master agent for the master agent to launch a master application on the master computing device,
   transmit a slave launch command to each of the slave agents for each respective slave agent to launch a slave application to be tested on each respective slave computing device, with each slave application being the same as the master application,
   receive from the master agent an input test command for the master application along with a test result based on execution of the input test command by the master application,
   transmit the received input test command to each slave agent,
   receive a respective test result from each slave agent based on execution of the received input test command by each respective slave application, and
   compare each respective test result from the plurality of slave computing devices to the test result from the master computing device.

2. The test controller according to claim 1 wherein the input test command comprises at least one of a screen touch, a mouse click, and a keystroke on the master computing device captured by the master agent.

3. The test controller according to claim 1 wherein an operating system of the master computing device is different than an operating system of at least one of the plurality of slave computing devices.

4. The test controller according to claim 1 wherein a respective slave agent is configured to translate a language of the input test command to a language that is compatible with a respective slave computing device.

5. The test controller according to claim 1 wherein the processor is configured to query the master agent and each one of the slave agents for a respective screen size when the input test command is screen input, and to calculate a screen coordinate of the input test command that matches a correlating screen coordinate of that respective slave computing device when the respective screen sizes are different.

6. The test controller according to claim 5 wherein the slave agent of each one of the plurality of slave devices is configured to detect whether an element at a modified screen coordinate of the input test command can be found at the correlating screen coordinate on a screen of the respective slave computing device and performing the received input test command thereon.

7. The test controller according to claim 1 wherein the slave agent of each one of the slave computing devices is configured to determine whether a text string or an image is present in the test result received from the master agent.

8. The test controller according to claim 7 wherein the slave agent on each one of the slave computing devices is configured to locate the text string or the image in the test result for each respective slave application to determine whether to indicate the test result as having passed when found, or having failed when not found, for the respective slave computing device.

9. A method for operating a test controller interfacing between a master computing device and a plurality of slave computing devices, and comprising a processor, the method comprising:
   initiating installation of a master agent on the master computing device,
   initiating installation of a slave agent on each one of the slave computing devices,
   transmitting a master launch command to the master agent for the master agent to launch a master application on the master computing device,
   transmitting a slave launch command to each of the slave agents for each respective slave agent to launch a slave application to be tested on each respective slave computing device, with each slave application being the same as the master application,
   receiving from the master agent an input test command for the master application along with a test result based on execution of the input test command by the master application,
   transmitting the received input test command to each slave agent,
   receiving a respective test result from each slave agent based on execution of the received input test command by each respective slave application, and
   comparing each respective test result from the plurality of slave computing devices to the test result from the master computing device.

10. The method according to claim 9 wherein the input test command comprises at least one of a screen touch, a mouse click, and a keystroke on the master computing device captured by the master agent.

11. The method according to claim 9 wherein the processor is configured to query the master agent and each one of the slave agents for a respective screen size when the input test command is screen input, and to calculate a screen coordinate of the input test command that matches a correlating screen coordinate of that respective slave computing device when the respective screen sizes are different.

12. The method according to claim 11 wherein the slave agent of each one of the plurality of slave devices is configured to detect whether an element at a modified screen coordinate of the input test command can be found at the correlating screen coordinate on a screen of the respective slave computing device and performing the received input test command thereon.

13. The method according to claim 9 wherein the slave agent of each one of the slave computing devices is configured to determine whether a text string or an image is present in the test result received from the master agent.

14. The method according to claim 13 wherein the slave agent on each one of the slave computing devices is configured to locate the text string or the image in the test result for each respective slave application to determine whether to indicate the test result as having passed when found, or having failed when not found, for the respective slave computing device.

15. A non-transitory computer readable medium for operating a test controller interfacing between a master computing device and a plurality of slave computing devices, and with the non-transitory computer readable medium having a plurality of computer executable instructions for causing the test controller to perform steps comprising:

initiating installation of a master agent on the master computing device, initiating installation of a slave agent on each one of the slave computing devices, transmitting a master launch command to the master agent for the master agent to launch a master application on the master computing device, transmitting a slave launch command to each of the slave agents for each respective slave agent to launch a slave application to be tested on each respective slave computing device, with each slave application being the same as the master application, receiving from the master agent an input test command for the master application along with a test result based on execution of the input test command by the master application, transmitting the received input test command to each slave agent, receiving a respective test result from each slave agent based on execution of the received input test command by each respective slave application, and comparing each respective test result from the plurality of slave computing devices to the test result from the master computing device.

16. The non-transitory computer readable medium according to claim 15 wherein the input test command comprises at least one of a screen touch, a mouse click, and a keystroke on the master computing device captured by the master agent.

17. The non-transitory computer readable medium according to claim 15 wherein the processor is configured to query the master agent and each one of the slave agents for a respective screen size when the input test command is screen input, and to calculate a screen coordinate of the input test command that matches a correlating screen coordinate of that respective slave computing device when the respective screen sizes are different.

18. The non-transitory computer readable medium according to claim 17 wherein the slave agent of each one of the plurality of slave devices is configured to detect whether an element at a modified screen coordinate of the input test command can be found at the correlating screen coordinate on a screen of the respective slave computing device and performing the received input test command thereon.

19. The non-transitory computer readable medium according to claim 15 wherein the slave agent of each one of the slave computing devices is configured to determine whether a text string or an image is present in the test result received from the master agent.

20. The non-transitory computer readable medium according to claim 19 wherein the slave agent on each one of the slave computing devices is configured to locate the text string or the image in the test result for each respective slave application to determine whether to indicate the test result as having passed when found, or having failed when not found, for the respective slave computing device.

\* \* \* \* \*